Figures 1, 2:
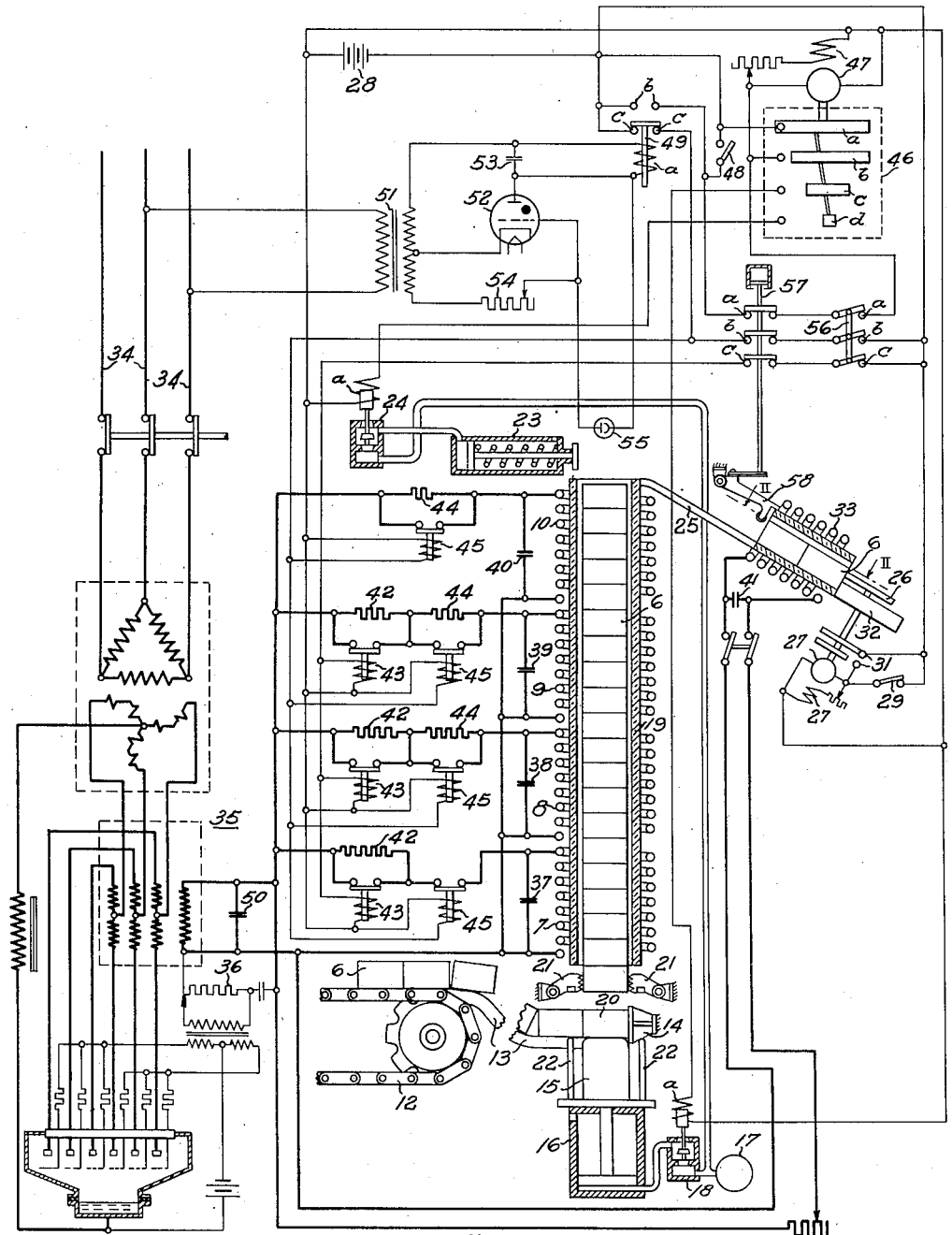

March 22, 1949.  S. R. DURAND  2,465,306
INDUCTION HEATING SYSTEM AND METHOD
FOR PROGRESSIVELY HEATING A
SERIES OF OBJECTS
Filed Aug. 6, 1945

Inventor
Samuel R. Durand
By Didier Journeaux
Attorney

Patented Mar. 22, 1949

2,465,306

UNITED STATES PATENT OFFICE 2,465,306

INDUCTION HEATING SYSTEM AND METHOD FOR PROGRESSIVELY HEATING A SERIES OF OBJECTS

Samuel R. Durand, Milwaukee, Wis., assignor to Allis-Chalmers Manufacturing Company, Milwaukee, Wis., a corporation of Delaware Application August 6, 1945, Serial No. 609,129

10 Claims. (Cl. 219—13)

1

This invention relates in general to improvements in induction heating systems and more particularly to an arrangement for the progressive heating of objects such as forging billets which must be heated within a narrow range of temperature regardless of the rate at which they are utilized.

When forging billets of relatively small size are to be heated successively in large numbers it is advantageous to progress the billets through suitable heating means such as an inductor or a series of inductors to gradually raise the temperature of the billets by induction of electric current therein. To obtain the highest possible output of the inductors the rate at which the billets are passed therethrough and the energization of the inductors should be correlated in such manner that the billets reach the desired temperature just prior to being ejected from the last inductor. It is generally necessary however to interrupt the progression of the billets from time to time to enable the forge operator to inspect and lubricate the forging dies and for other reasons. During such interruptions, if the energization of the inductors remains unchanged the billets are subjected to abnormal heating and some of the billets may reach excessively high temperatures. If on the other hand, the energization of the inductors is interrupted, the billets cool off, and after the inductors are subsequently reenergized it is necessary to wait for a substantial length of time before the normal temperature distribution of the billets in the inductors is again attained and progression of the billets can be resumed.

The above disadvantages may be obviated by progressing the billets through an inductor or other equivalent heating means wherein the billet temperature is gradually raised to the desired value during progression of the billets and storing the heated billets within a second inductor energized only to the extent required to maintain the billets at the desired temperature. The billets held within the storing inductor may then be withdrawn as required while the billets contained within the heating inductor progress at a constant rate or at a rate controlled in dependence upon the temperature of the foremost billet.

When interruptions in the utilization of the billets may have such duration that storing of an excessive number of billets would result, the heating inductor may be replaced by a series of inductors severally connected to the source for normal operation. When the progression of the billets through the heating inductors is interrupted the connection of the different inductors with the source are modified to reduce the flow of current through the several inductors to the extent required for maintaining the temperature distribution of the billets substantially the same as during progression of the billets.

When initially heating a series of billets or when reheating a load of cold billets after relatively long shut-down of the system the billets are first held stationary and the current distribution through the different inductors is at first further modified to cause the billets to reach in the shortest possible length of time substantially the temperature distribution normally reached during progression thereof. When such temperature distribution is attained, the connections for maintaining the temperature distribution either while the billets remain stationary or are progressed may be established in response to the temperature of any billet convenient for that purpose.

It is therefore a purpose of the present invention to provide a system for heating a series of objects in which the temperature distribution of the objects is maintained substantially the same when the objects are progressing and when the objects are stationary.

Another purpose of the present invention is to provide a heating system for a progressing series of objects whereby objects heated to the required temperature may be maintained at a constant temperature without interfering with the progression of the remaining objects.

Another purpose of the present invention is to provide a heating system for a progressing series of objects whereby the objects, while being maintained stationary, may be brought from the unheated condition to temperatures having substantially the distribution resulting from progressive heating of the objects.

Another purpose of the present invention is to provide a method of heating a series of stationary objects to bring the objects to temperatures having the same distribution as that obtained during progressive heating of the objects.

Another purpose of the present invention is to provide a method of heating a series of stationary objects previously heated by progressive heating for maintaining the temperature distribution through the objects the same as while the objects were subjected to progressive heating.

Other purposes and advantages of the present invention will be apparent from a consideration of the following description when read in connection with the accompanying drawing, in which:

Fig. 1 diagrammatically illustrates a system for automatically heating a progressing stack of billets by induction in accordance with the present invention; and Fig. 2 is a view on an enlarged scale of the billet discharging device taken along line II—II in Fig. 1.

Referring more particularly to the drawing by characters of reference, Fig. 1 shows a system for progressive heating of objects such as a series of billets 6 to be brought to the proper temperature for forging in a forging press (not shown). The term progressive heating refers to heating of the billets while they are continuously moving or are being held in a plurality of successive stationary positions within an inductor or a series of inductors. The inductors consist of aligned windings 7, 8, 9, 10 connected to a suitable source of alternating current to be energized therefrom and cause the flow of heating currents within the objects by electromagnetic induction, at least when the objects are good conductors of electriciy. The term inductor, however, is intended herein to also include electrodes connected to a source of alternating potential for the production of heat in poor conductors of electricity by electrostatic induction (dielectric heating).

Billets 6 are preferably brought into position for being inserted into the inductors by means of a conveyer of any suitable known type herein represented as a chain belt conveyer 12. The billets are deposited by conveyer 12 into a chute 13 at the end of which they are held by a stop 14. The billets are preferably progressed step by step through the inductors by means of a ram 15 actuated by an elevator of any suitable known type such as a pneumatic elevator 16. The elevator may be supplied with air or other fluid under pressure contained within a reservoir 17, through a suitable magnet valve 18. The ram raises the billets into an insulating lining 19 disposed within inductors 7 to 10 and serving to guide the billets, insulate them from the inductors and reduce the loss of heat from the billets by radiation.

Between operations of elevator 16 the stack of billets is held by means of a pair of friction pawls 21 or equivalent devices. Ram 15 is associated with push rods 22 suitably disposed for maintaining pawls 21 out of engagement with the stack of billets during part of the stroke of the ram.

The operation of ram 15 for adding billets to the lower part of the stack contained within lining 19 also causes at least the topmost billet of this stack to be raised above the top end of lining 19. The topmost billet may then be pushed aside by a pneumatic motor 23 supplied with compressed air from reservoir 17 through a magnet valve 24. The billets so removed from the stack slide into a chute 25 wherein they may be stored and from which they may subsequently be ejected at a constant rate or withdrawn at will by the operator for transfer to the forging press.

The billets contained in chute 25 are held therein by any suitable releasing mechanism permitting removal of the billets one at a time. For example, the billets may be held by a cam 26 which may be rotated by an electric motor 27 energized from a suitable source of electric current conventionally represented as a battery 28. The operation of motor 27 is controlled by a switch 29 associated with holding contacts 31 for causing the motor to return cam 26 to the position shown in Fig. 2 subsequently to any opening of switch 29. The billets ejected from chute 25 by cam 26 are received in another chute 32 for delivery to their point of utilization.

The billets stored in chute 25 are enclosed within an inductor 33 energized to the necessary extent to maintain the billets at the desired temperature. Inductors 7 to 10 and 33 may be energized from any suitable known source of current of the intensity and frequency appropriate for heating billets of the required size. For example, for heating billets having a cross section of a few square inches, the inductor may be energized from an alternating current circuit 34 operating at 60 cycles per second or at some other low frequency through a known converting system 35 of the electric valve type delivering current at a frequency of 1000 or more cycles per second.

The output voltage and the frequency of the converter may be regulated by shifting the phase of the alternating potential component impressed on the grids of the valves through an adjustable resistor 36 forming part of a phase shifting circuit as is well known. Capacitors 37 to 41 are severally connected in parallel with the inductors to raise the power factor of the current supplied by the converter to substantially unity. A further capacitor 50 connected across the output terminals of converter 35 causes the total output current of the converter to have a leading power factor to thereby insure proper commutation between the different valves of the converter.

When the progression of billets 6 through inductors 7 to 10 is interrupted, the currents of the inductors may be reduced to different extents by any suitable current regulating means. For example, the connections between converter 35 and inductors 7 to 9 may comprise a plurality of resistors 42 of different values which may be short circuited by means of switches 43. The connections between the converter and inductors 7 to 10 may further include a second plurality of resistors 44 associated with a second plurality of switches 45.

The operation of elevator 16 and motor 23 is preferably controlled by automatic means including a timer 46 driven by a motor 47 energized from battery 28. Timer 46 comprises a segment 46a continuously connected with battery 28, a holding segment 46b for controlling the operation of motor 47, a segment 46c controlling the connection of the coil 18a of valve 18 with battery 28 and a segment 46d controlling the connection of the coil 24a of valve 24 with battery 28.

Motor 47 may be connected with battery 28 through a switch 48 or through contacts 49b of a relay 49. The coil 49a of the relay may be supplied with rectified current from circuit 34 through a transformer 51 and a thyratron 52, the flow of current through coil 49a being rendered substantially uniform by means of a smoothing capacitor 53 The thyratron grid is connected to the associated cathode through a resistor 54 and a portion of the secondary winding of transformer 51. The grid is also connected to the associated anode through a phototube 55 disposed to be responsive to radiation emitted from the topmost billet enclosed within inductor 10 to cause the thyratron to become conductive when the billet reaches a predetermined temperature.

The operation of timer 46 may be interrupted at will by means of a switch 56 having a contact 56a connecting motor 47 with battery 28 through contacts 49b and through contact 57a of another switch 57. The latter switch is operable with a time delay by means of a tripping lever 58 in response to storage of billets in chute 25 in greater number than can be contained within inductor 33. Further contacts 56b, 57b are connected in parallel with contacts 49c in the circuit of the coils of switches 45. Contacts 56c, 57c are connected in series with the coils of switches 43.

The system illustrated in Fig. 1 is shown connected for heating billets at the maximum rate for which the system is designed, progression of the billets through inductors 7 to 10 taking place at a rate determined by the temperature of the topmost billet contained within inductor 10. The heated billets are stored in chute 25 and delivered therefrom to chute 32 at a constant rate. During such operation of the system, converter 35 is energized from circuit 34 and supplies current to the inductors at a frequency depending upon the inductance of the inductors and the capacitance of the capacitors connected with the converter output circuit. The output voltage of the converter may be adjusted by shifting the phase of the grid potential component impressed on the converter grids by displacing the tap of resistor 36, thereby also modifying the output frequency of the converter.

During progression of the billets through inductors 7 to 10, the inductors are energized at the full output voltage of converter 35 through the contacts of switches 43 and 45. The flow of current through the inductors causes induced currents to flow within the billets, whereby the billets are gradually heated. As cold billets are introduced from time to time into inductor 7 and hot billets removed from inductor 10, each billet is progressively lifted while its temperature is being raised. The temperature of the stack of billets is thereby imparted a predetermined distribution and the topmost billet, which has been heated longer than the remaining billets, reaches the highest temperature.

When this temperature reaches a predetermined value depending on the adjustment of resistor 54, phototube 55 becomes sufficiently conductive in response to radiation from the billet to cause thyratron 52 to become conductive. Current is then supplied from transformer 51 to coil 49a through thyratron 52. Relay 49 closes contacts 49b to complete a circuit from battery 28 through contacts 49b, 57a, 56a and motor 47 back to the battery. Motor 47 drives timer 46, which first closes the holding circuit for the motor through segments 46a and 46b. A circuit is thereafter completed from battery 28 through segments 46a, 46c, and coil 18a back to the battery. Valve 18 is thereby actuated to supply compressed air from reservoir 17 to elevator 16.

The elevator raises ram 15, which lifts the billet 20 abutting against stop 14 and gradually occupies the space previously taken by billet 20 to serve as abutment for the next billet contained in the lower part of chute 13. Further movement of ram 15 causes billet 20 to be applied against the bottom billet of the stack to raise the stack, which is thereby released from friction pawls 21. When the stack has been raised by the thickness of one billet, push rods 22 move pawls 21 out of frictional engagement with the sides of the billets. Completion of the stroke of elevator 16 raises the stack to an extent sufficient to bring the topmost billet above the end of lining 19.

While the stack is held in its raised position, continued rotation of timer 46 causes segment 46d to connect coil 24a with battery 28. Valve 24 admits air from reservoir 17 to motor 23, which shifts the topmost billet of the stack into chute 25. The timer thereafter disconnects coil 24a from battery 28, and motor 23 is immediately returned to the position shown by a spring or equivalent means.

Coil 18a is thereafter also deenergized, and elevator 16 returns toward the position shown. The stack is thereby dropped from its highest position, but when the stack returns to the position shown push rods 22 disengage from pawls 21 and the pawls take hold of billet 20, which is then the lowermost billet of the stack. When ram 15 is returned to its lowermost position another billet is thereby enabled to slide from chute 13 to the top of the ram in abutment with stop 14 to replace billet 20. If the top billet then has not reached the final temperature to which the billets are to be heated and for which resistor 54 is adjusted, thyratron 52 returns to the nonconductive condition and relay 49 returns to the position shown. When timer 46 returns to the position shown, the circuit of motor 47 is then opened at segment 46b and the motor stops until operation thereof is reinitiated in the manner above set forth.

The billets ejected from inductor 10 slide down chute 25. If the space within inductor 33 is not filled with billets the incoming billet slides past tripping lever 58. The lever is momentarily actuated and returns to the position shown without causing opening of switch 57.

The supply of current to inductor 33 is so adjusted that the inductor supplies to the billets enclosed therein the amount of heat being lost by the billets by radiation, conduction and convection to thereby maintain the billets at substantially the desired temperature. If switch 29 is maintained closed, motor 27 rotates continuously at a constant adjustable speed to cause cam 26 to rotate counterclockwise when viewed as shown in Fig. 2. During each revolution of cam 26 from the position shown the cam gradually allows the billets stored within inductor 33 to slide down until they have moved by the length of one billet. The radial edge of the cam then moves the lowermost billet out of alignment with inductor 33 and allows the billet so slide in chute 32 toward its point of utilization while the remaining billets are held stationary.

It will be understood that if the supply of current to inductors 7 to 10 can be maintained substantially uniform over long periods of time, timer 46 may be allowed to operate without interruption by connecting motor 47 with battery 28 through switch 48. It is then necessary however to so adjust the speed of motor 47 that the billets reach the desired temperature when fed into the inductors at the constant rate equal to the number of revolutions of timer 46 per unit time.

Instead of causing cam 26 to eject billets from inductor 33 at a constant rate, ejection of billets one by one may be obtained by generally leaving switch 29 open and momentarily closing the switch whenever a single billet is to be ejected. Motor 27 starts upon each closure of switch 29 and is maintained energized through contacts 31 to cause cam 26 to effect a single revolution and return to the position shown. The billets may thus be allowed to accumulate in inductor 33 to be afterward withdrawn at the convenience of the operator. The billets ejected from inductor 10 may also be allowed to slide directly into chute 32 by removing cam 26 from the path of the billets.

When it is desired to stop the progression of billets through inductors 7 to 10, switch 56 is opened to cause timer 46 to stop upon its next return to the position shown. Likewise if an excessive accumulation of billets takes place in inductor 33 a billet engages lever 58 for a sufficient length of time to cause opening of switch 57 and stoppage of timer 46. If inductors 7 to 10 then remained energized at the full output voltage of converter 35 the billets would become heated to temperatures higher than the desired final temperature reached during progression of the billets.

Assuming that relay 49 has opened contacts 49c in response to heating of the topmost billet to the desired temperature, opening of switch 56 or switch 57 causes deenergization of the coils of switches 43, 45, and the switches open to insert resistors 42, 44 in series with inductors 8, 9, 10 and disconnect inductor 7 from converter 35. The resistances of the different resistors are so selected that the inductors then supply to each billet substantially the amount of heat lost by radiation, conduction and convection less the amount received from adjacent billets to maintain each billet at substantially the temperature reached thereby at the time of interruption of the progression. The temperature distribution of the billets thus remains substantially the same as during progression thereof. Upon subsequent reclosure of switches 56, 57 heating and progression of the billets will be resumed as if the operation had not been interrupted. The danger of overheating the billets is thereby avoided as well as delay that would be caused by the billets cooling off during interruption of the progression.

When the system is to be placed out of operation for a substantial length of time, converter 35 is deenergized, and the progression of the billets is interrupted by opening switch 56. Operation of the system is subsequently resumed with inductors 7 to 10 containing a stack of unheated billets. Phototube 55 therefore is not subjected to radiation and thyratron 52 is in the nonconductive condition, thereby causing relay 49 to remain in the position shown. Contacts 49c connect the coils of switches 45 with battery 28 so that switches 45 short circuit resistors 44 and connect inductor 7 with converter 35. Switches 43 however remain open so that resistors 42 remain in circuit with inductors 7, 8, 9. When converter 35 is again placed in operation inductor 10 is energized at the full output voltage of the converter to raise the temperature of the upper part of the stack of billets at the highest possible rate. The flow of current through inductors 7, 8, 9 however is reduced to an extent such as when the topmost billet reaches the desired final temperature, the temperature distribution through the stack of billets is substantially that obtained during progressive heating of the billets.

When the topmost billet reaches the desired temperature, relay 49 operates to deenergize the coils of switches 45, and the switches disconnect inductor 7 and insert resistors 44 in circuit with inductors 8, 9, 10 to maintain the temperature of the billets substantially the same as during progressive heating thereof. Progressive heating may then be resumed by reclosing switch 56 as if the operation had not been interrupted.

It will be understood that the temperature distribution obtained by differentially energizing the different inductors through which the billets are to progress may be caused to approximate to any desired extent the temperature distribution obtained during progressive heating by increasing the number of inductors. The temperature distribution may be obtained exactly the same during progressive heating and while the billets are stationary by providing separate inductors in number equal to the number of billets of the stack and properly selecting the values of resistors 42 and 44 in the circuits of the different inductors. It will be understood that the values of the resistors vary for different arrangements of inductors, different sizes of billets and different speeds of progression, and should preferably be determined experimentally in every instance.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for progressively heating a series of objects by induction comprising a plurality of inductors and a source of alternating current, the combination of means for progressing each of said objects from an initial position to a final position through the different said inductors in succession at a predetermined rate, means cooperating with said progressing means for so connecting each of said inductors to said source that the temperature of said objects assumes a predetermined temperature gradient between said initial and said final positions during progression of said objects, means for interrupting said progression, and means including current controlling elements for so changing the value of the current supplied to said each of said inductors from said source that said temperature gradient is substantially maintained during interruption of said progression.

2. In a system for progressively heating a series of objects by induction comprising a plurality of inductors and a source of alternating current, the combination of means for progressing each of said objects from an initial position to a final position through the different said inductors in succession at a predetermined rate, means for similarly connecting the different said inductors with said source cooperating with said progressing means to cause the temperature of said objects to rise gradually from an initial temperature during progression thereof from said initial to said final position, means for interrupting the said progression, and means including switch elements for so dissimilarly connecting the different said inductors with said source during interruption of said progression that the temperature of each of said objects is thereafter maintained substantially equal to the temperature thereof at the time of said interruption.

3. In a system for progressively heating a series of objects by induction comprising a plurality of inductors and a source of alternating current, the combination of means for progressing each of said objects from an initial position to a final position through the different said inductors in succession at a predetermined rate, means for similarly connecting each of said inductors to said source cooperating with said progressing means to cause the temperature of said objects to be raised through a predetermined temperature gradient from an initial temperature at said initial position during progression of said objects, means for interrupting said progression, and means including switch elements for so dissimilarly connecting the different said inductors with said source during interruption of said progression that the temperature of said objects between said positions is raised from said uniform initial value for each of said objects to predetermined dissimilar values for all of said objects, said values corresponding substantially to said temperature gradient at the time of said interruption.

4. In a system for progressively heating a series of objects by induction comprising a plurality of inductors and a source of alternating current, the combination of means for progressing each of said objects from an initial position to a final position through the different said inductors in succession at a predetermined rate, means for similarly connecting each of said inductors to said source cooperating with said progressing means to cause the temperature of said objects to be raised through a predetermined temperature gradient from an initial temperature at said initial position to a final temperature at said final position during progression of said objects, means for interrupting said progression and for interrupting the supply of current to said inductors from said source, and means for reestablishing normal operation of said system comprising switch elements for so dissimilarly reconnecting the different said inductors with said source that the temperature of said objects between said positions is raised from said initial value to predetermined values substantially corresponding to said temperature gradient at the time of said interruption and means including current controlling elements for so changing the value of the current supplied to said inductors from said source upon the temperature of said objects reaching substantially said predetermined values that the temperatures of said objects between said positions correspond substantially to said temperature gradient during continued interruption of said progression.

5. In a system for progressively heating a series of objects by induction comprising a plurality of inductors and a source of heating current, the combination of means for progressing each of said objects from an initial position to a final position through the different said inductors in succession at a predetermined rate, means for similarly connecting each of said inductors to said source cooperating with said progressing means to cause the temperature of said objects to be raised through a predetermined temperature gradient from an initial temperature at said initial position to a final higher temperature at said final position during progression of said objects, means for interrupting said progression and for interrupting the supply of current to said inductors from said source, and means for reestablishing normal operation of said system comprising electrically conductive elements for so dissimilarly reconnecting the different said inductors with said source during interruption of said progression that the temperature of said objects between said positions is raised from said initial value to predetermined values substantially corresponding to said temperature gradient at the time of said interruption and means comprising a heat sensitive device responsive to the temperature of one of said objects and further electrically conductive elements for so changing the connection of said inductors with said source upon the temperature of said objects between said positions substantially reaching said predetermined temperatures that said temperature gradient is substantially maintained.

6. In a system for progressively heating a series of objects by induction comprising a plurality of inductors and a source of alternating current, the combination of means for progressing each of said objects from an initial position to a final position through the different said inductors in succession at a predetermined rate, means for similarly connecting the different said inductors with said source cooperating with said progressing means to cause the temperature of said objects to rise gradually from an initial temperature to a final temperature during progression thereof from said initial position to said final position, means for interrupting the said progression, means including electrically conductive elements for so dissimilarly connecting the different said inductors with said source during interruption of said progression that the temperature of each of said objects is thereafter maintained substantially equal to the temperature thereof at the time of said interruption, an additional inductor, conveyor means for moving said objects from said final position to said additional inductor, means including electrically conductive elements for so connecting said source to said additional inductor that said objects are maintained at said final temperature when stored in said additional inductor, and means including a heat sensitive device responsive to the temperature of each of said objects in said final position for causing said conveyor means to transfer said objects from said final position to said additional inductor when said objects reach said final temperature in said final position.

7. In a system for progressively heating a series of objects by induction comprising a plurality of inductors and a source of energizing current therefor, the combination of means for progressing each of said objects from an initial position to a final position through the different said inductors at a predetermined rate, means for connecting each of said inductors to said source to raise the temperature of said objects through a predetermined temperature gradient along said inductors from an initial temperature at said initial position to a predetermined final temperature at said final position during progression of said objects through said inductors, said circuit means including at least one resistor in a circuit with each of said inductors and at least one switch shunting said resistor in each of said circuits, means for interrupting said progression and for interrupting the supply of current to said inductors from said source, means for causing reconnection of said inductors to said source, means including a heat sensitive device responsive to said predetermined final temperature of one of said objects in said final position for opening said one switch in each of said circuits upon said object reaching said final temperature to insert said resistor in series connection with each of said circuits, said resistor being so dimensioned as to cause the flow of said energizing current to be changed through each of said circuits to a value substantially maintaining the temperature gradient through said series of objects during said interruption substantially the same as during progression of said objects.

8. In a system for progressively heating a series of objects by induction comprising a plurality of successively disposed inductors and a source of alternating current, the combination of means for progressing each of said objects through said inductors from an initial position to a final position, means for interrupting said progression, means for carrying current from said source to said inductors to raise the temperature of each of said objects through a predetermined temperature gradient from an initial temperature at said initial position to a final temperature at said final position, said current-carrying means including a circuit for connecting one of said inductors to said source, said circuit including at least one resistor and a switch for shunting said resistor, another circuit for connecting another of said inductors to said source, said other circuit including a plurality of resistors each having a shunting switch therefor, a capacitor connected across each of said inductors to correct the power factor of current supplied thereto, means associated with said switches in each of said circuits to open said switches upon interruption of said progression to so insert said resistors in each of said circuits that the flow of said current through each of said inductors is reduced to maintain said temperature gradient, said means including means for selectively closing one of said switches in said other circuit to so withdraw one of said resistors from said other circuit that the flow of current through said other of said inductors following initial connection of said source to said inductors establishes said temperature gradient prior to initiation of said progression.

9. A method of progressively heating a series of objects from an initial temperature to a final temperature by so progressing a series of objects through a plurality of inductors from an initial position to a final position that the temperature of said objects assumes a predetermined temperature gradient between said positions along the length of said inductors, said method comprising the steps of disposing a series of stationary objects having said initial temperature in said inductors and of energizing different said inductors with dissimilar currents to raise the temperature of said objects between said positions to correspond substantially to said temperature gradient.

10. A method of heating comprising the steps of progressing a series of objects successively through a plurality of energized inductors from an initial position to a final position to cause the temperature of said objects to correspond to a predetermined temperature gradient between said positions along the length of said inductors, interrupting the progression of said objects, and changing the energization of said inductors to cause the temperature of said objects to substantially correspond to said temperature gradient during said interruption of movement of said objects through said inductors.

SAMUEL R. DURAND.

REFERENCES CITED

The following references are of record in the file of this patent:

UNITED STATES PATENTS

| Number | Name | Date |
|---|---|---|
| 1,473,213 | De Matteis | Nov. 6, 1923 |
| 1,937,420 | Wood et al. | Nov. 28, 1933 |
| 1,943,802 | Northrup | Jan. 16, 1934 |
| 1,946,876 | Northrup | Feb. 13, 1934 |
| 1,971,091 | Anderson | Aug. 21, 1934 |
| 1,981,631 | Northrup | Nov. 20, 1934 |
| 1,985,805 | Spire | Dec. 25, 1934 |
| 2,008,007 | Dreffein | July 16, 1935 |
| 2,041,029 | Stargardter | May 19, 1936 |
| 2,089,015 | Bucknam et al. | Aug. 3, 1937 |
| 2,202,759 | Denneen et al. | May 28, 1940 |
| 2,325,638 | Strickland | Aug. 3, 1943 |
| 2,386,966 | MacMillan | Oct. 16, 1945 |